(12) United States Patent
Rados et al.

(10) Patent No.: US 10,802,513 B1
(45) Date of Patent: Oct. 13, 2020

(54) COMFORT CONTROL SYSTEM WITH HIERARCHICAL SWITCHING MECHANISMS

(71) Applicant: Braeburn Systems LLC, Montgomery, IL (US)

(72) Inventors: Robert Rados, Yorkville, IL (US); Daniel Poplawski, Oswego, IL (US)

(73) Assignee: Braeburn Systems LLC, Montgomery, IL (US)

( * ) Notice: Subject to any disclaimer, the term of this patent is extended or adjusted under 35 U.S.C. 154(b) by 0 days.

(21) Appl. No.: 16/407,899

(22) Filed: May 9, 2019

(51) Int. Cl.
| | |
|---|---|
| *G05D 23/19* | (2006.01) |
| *H05B 1/02* | (2006.01) |
| *G06F 3/0484* | (2013.01) |
| *G05B 19/10* | (2006.01) |

(52) U.S. Cl.
CPC ....... *G05D 23/1917* (2013.01); *G05B 19/108* (2013.01); *G06F 3/0484* (2013.01); *H05B 1/0202* (2013.01); *H05B 1/0275* (2013.01)

(58) Field of Classification Search
CPC .............. G05D 23/1917; G05B 19/108; H05B 1/0275; H05B 1/0202; G06F 3/0484
See application file for complete search history.

(56) References Cited

U.S. PATENT DOCUMENTS

| | | |
|---|---|---|
| 2,054,039 A | 9/1936 | Persons |
| 2,060,636 A | 11/1936 | Persons |
| 2,253,418 A | 8/1941 | Crandall et al. |
| 2,703,228 A | 3/1955 | Fleisher |
| 3,309,021 A | 3/1967 | Powers |
| 3,385,574 A | 5/1968 | Lohman |
| 3,481,588 A | 12/1969 | Lobb |
| 3,705,479 A | 12/1972 | McPherson |

(Continued)

FOREIGN PATENT DOCUMENTS

| | | |
|---|---|---|
| GB | 2441221 | 2/2006 |
| JP | 58065977 | 4/1983 |

(Continued)

OTHER PUBLICATIONS

ComfortLink II XL950 Control, User Guide, Trane U.S. Inc., 2011.

(Continued)

*Primary Examiner* — Charles R Kasenge
(74) *Attorney, Agent, or Firm* — The Law Offices of Konrad Sherinian LLC

(57) ABSTRACT

An improved comfort control system for controlling an environment regulation system includes a processing unit, a video interface, an input subsystem, a hierarchy of switching mechanisms and a special computer program. The hierarchy of switching mechanisms includes an electronic switching mechanism having a jumper and a second tier switching mechanism implemented by the special computer program and including a key combination. When the control device is in an operation mode and the jumper is in an enabled position, entering the key combination causes the special computer program to switch the comfort control system to the configuration mode. When the comfort control system is in an operation mode and the jumper is in a disabled position, the special computer program does not switch the control device to the configuration mode from the operation mode.

11 Claims, 7 Drawing Sheets

(56) References Cited

U.S. PATENT DOCUMENTS

| | | |
|---|---|---|
| 3,724,824 A | 4/1973 | Mitich |
| 3,733,062 A | 5/1973 | Bracich |
| 3,774,588 A | 11/1973 | Yeagle |
| 3,799,517 A | 3/1974 | Tamm |
| 3,823,922 A | 7/1974 | McElreath |
| 4,036,597 A | 7/1977 | Filss |
| 4,056,582 A | 11/1977 | Chow |
| 4,075,864 A | 2/1978 | Schrader |
| 4,185,687 A | 1/1980 | Stockman |
| 4,316,256 A | 2/1982 | Hendricks et al. |
| 4,382,544 A | 5/1983 | Stewart |
| 4,399,031 A | 8/1983 | Imano et al. |
| 4,420,794 A | 12/1983 | Anderson |
| 4,606,401 A | 8/1986 | Levine |
| 4,730,941 A | 3/1988 | Levine et al. |
| 4,733,719 A | 3/1988 | Levine |
| 4,838,482 A | 6/1989 | Vogelzang |
| 4,948,040 A | 8/1990 | Kobayashi et al. |
| 4,967,382 A | 10/1990 | Hall |
| 5,023,432 A | 6/1991 | Boykin |
| 5,038,851 A | 8/1991 | Mehta |
| 5,171,486 A | 12/1992 | Penno |
| 5,230,482 A | 7/1993 | Ratz et al. |
| 5,259,445 A | 11/1993 | Pratt et al. |
| 5,289,362 A | 2/1994 | Liebl et al. |
| 5,428,964 A | 7/1995 | Lobdell |
| 5,482,209 A | 1/1996 | Cochran et al. |
| 5,491,615 A | 2/1996 | Nichols |
| 5,547,017 A | 8/1996 | Rudd |
| 5,566,879 A | 10/1996 | Longtin |
| 5,673,850 A | 10/1997 | Uptegraph |
| 5,697,552 A | 12/1997 | McHugh et al. |
| 5,765,636 A | 6/1998 | Meyer et al. |
| 5,782,296 A | 7/1998 | Mehta |
| 5,795,505 A | 8/1998 | Penno |
| 5,873,519 A | 2/1999 | Beilfuss |
| 5,924,486 A | 7/1999 | Ehlers et al. |
| 5,937,942 A | 8/1999 | Bias et al. |
| 5,983,146 A | 11/1999 | Sarbach |
| 6,116,512 A | 9/2000 | Dushane |
| 6,196,467 B1 | 3/2001 | Dushane |
| 6,205,533 B1 | 3/2001 | Margolous et al. |
| 6,211,782 B1 | 4/2001 | Sandelman et al. |
| 6,213,404 B1 | 4/2001 | Dushane |
| 6,241,156 B1 | 6/2001 | Kline et al. |
| 6,304,803 B1 | 10/2001 | Dao |
| 6,315,211 B1 | 11/2001 | Sartain |
| 6,318,639 B1 | 11/2001 | Toth |
| 6,415,023 B2 | 1/2002 | Iggulden |
| 6,435,418 B1 | 8/2002 | Toth et al. |
| 6,478,233 B1 | 11/2002 | Shah |
| 6,499,038 B2 | 12/2002 | Kitayama |
| 6,502,758 B2 | 1/2003 | Cottrell |
| 6,549,870 B2 | 4/2003 | Proffitt et al. |
| 6,595,430 B1 | 7/2003 | Shah |
| 6,617,954 B2 | 9/2003 | Firestine |
| 6,621,507 B1 | 9/2003 | Shah |
| 6,628,997 B1 | 9/2003 | Fox et al. |
| 6,714,222 B1 | 3/2004 | Bjorn et al. |
| 6,783,079 B2 | 8/2004 | Carey et al. |
| 6,814,299 B1 | 11/2004 | Carey |
| 6,824,069 B2 | 11/2004 | Rosen |
| 6,851,621 B1 | 2/2005 | Wacker et al. |
| 6,892,547 B2 | 5/2005 | Strand |
| 6,988,671 B2 | 1/2006 | DeLuca |
| 7,003,378 B2 | 2/2006 | Poth |
| 7,028,912 B1 | 4/2006 | Rosen |
| 7,047,092 B2 | 5/2006 | Wimsatt |
| 7,050,026 B1 | 5/2006 | Rosen |
| 7,055,759 B2 | 6/2006 | Wacker et al. |
| D524,663 S | 7/2006 | Moore |
| D525,154 S | 7/2006 | Moore |
| D527,288 S | 8/2006 | Moore |
| D527,658 S | 9/2006 | Moore |
| D530,633 S | 10/2006 | Moore |
| 7,114,554 B2 | 10/2006 | Bergman et al. |
| D531,528 S | 11/2006 | Moore |
| 7,142,948 B2 | 11/2006 | Metz |
| D533,793 S | 12/2006 | Moore |
| D534,088 S | 12/2006 | Moore |
| 7,146,253 B2 | 12/2006 | Hoog et al. |
| D534,443 S | 1/2007 | Moore |
| 7,156,317 B1 | 1/2007 | Moore |
| 7,156,318 B1 | 1/2007 | Rosen |
| D536,271 S | 2/2007 | Moore |
| 7,181,317 B2 | 2/2007 | Amundson et al. |
| 7,222,800 B2 | 5/2007 | Wruck |
| 7,225,054 B2 | 5/2007 | Amundson et al. |
| 7,274,972 B2 | 9/2007 | Amundson et al. |
| 7,287,709 B2 | 10/2007 | Proffitt et al. |
| 7,302,642 B2 | 11/2007 | Smith et al. |
| 7,306,165 B2 | 12/2007 | Shah |
| 7,320,110 B2 | 1/2008 | Shah |
| 7,360,717 B2 | 4/2008 | Shah |
| 7,438,469 B1 | 10/2008 | Moore |
| 7,454,269 B1 | 11/2008 | Dushane et al. |
| 7,489,303 B1 | 2/2009 | Pryor |
| 7,513,438 B2 | 4/2009 | Mueller |
| 7,556,207 B2 | 7/2009 | Mueller et al. |
| 7,565,813 B2 | 7/2009 | Pouchak |
| 7,575,179 B2 | 8/2009 | Morrow et al. |
| 7,584,897 B2 | 9/2009 | Schultz et al. |
| 7,593,212 B1 | 9/2009 | Toth |
| 7,604,046 B2 | 10/2009 | Bergman et al. |
| 7,614,567 B2 | 11/2009 | Chapman, Jr. et al. |
| 7,636,604 B2 | 12/2009 | Bergman et al. |
| 7,693,582 B2 | 4/2010 | Bergman et al. |
| 7,693,583 B2 | 4/2010 | Wolff et al. |
| 7,703,694 B2 | 4/2010 | Mueller et al. |
| 7,706,923 B2 | 4/2010 | Amundson et al. |
| 7,748,225 B2 | 7/2010 | Butler et al. |
| 7,702,421 B2 | 8/2010 | Sullivan et al. |
| 7,775,454 B2 | 8/2010 | Mueller et al. |
| 7,784,291 B2 | 8/2010 | Butler et al. |
| 7,784,705 B2 | 8/2010 | Kasper et al. |
| 7,801,646 B2 | 9/2010 | Amundson et al. |
| 7,802,618 B2 | 9/2010 | Simon et al. |
| 7,845,576 B2 | 12/2010 | Siddaramanna |
| 7,861,941 B2 | 1/2011 | Schultz et al. |
| 7,867,646 B2 | 1/2011 | Rhodes |
| 7,941,819 B2 | 5/2011 | Stark |
| 7,954,726 B2 | 6/2011 | Siddaramanna et al. |
| 7,963,454 B2 | 6/2011 | Sullivan |
| D643,318 S | 8/2011 | Morrow |
| 7,992,794 B2 | 8/2011 | Leen et al. |
| 8,066,263 B1 | 11/2011 | Soderlund |
| 8,083,154 B2 | 12/2011 | Schultz et al. |
| 8,091,795 B1 | 1/2012 | McLellan |
| 8,167,216 B2 | 5/2012 | Schultz et al. |
| 8,175,782 B2 | 5/2012 | Gepperth et al. |
| D662,837 S | 7/2012 | Morrow |
| D662,838 S | 7/2012 | Morrow |
| D662,839 S | 7/2012 | Morrow |
| D662,840 S | 7/2012 | Morrow |
| D663,224 S | 7/2012 | Morrow |
| 8,219,251 B2 | 7/2012 | Amundson et al. |
| 8,239,067 B2 | 8/2012 | Amundson et al. |
| 8,239,922 B2 | 8/2012 | Sullivan |
| 8,244,383 B2 | 8/2012 | Bergman et al. |
| 8,280,536 B1 | 10/2012 | Fadell et al. |
| 8,346,396 B2 | 1/2013 | Amundson et al. |
| 8,387,892 B2 | 3/2013 | Koster et al. |
| 8,517,088 B2 | 8/2013 | Moore et al. |
| 8,538,588 B2 | 9/2013 | Kasper |
| 8,549,658 B2 | 10/2013 | Kolavennu et al. |
| 8,620,460 B2 | 12/2013 | Eergman et al. |
| 8,689,353 B2 | 4/2014 | Bünter |
| 8,690,074 B2 | 4/2014 | Moore et al. |
| 8,701,210 B2 | 4/2014 | Cheng et al. |
| 8,733,667 B2 | 5/2014 | Moore et al. |
| 8,950,687 B2 | 2/2015 | Bergman |
| 8,978,994 B2 | 3/2015 | Moore et al. |
| 9,014,860 B2 | 4/2015 | Moore et al. |
| 9,201,431 B2 | 12/2015 | Lyle |

(56) References Cited

U.S. PATENT DOCUMENTS

| | | |
|---|---|---|
| 9,304,676 B2 | 4/2016 | Poplawski |
| 9,989,273 B2 | 6/2018 | Read et al. |
| 2001/0003451 A1 | 6/2001 | Armstrong |
| 2002/0065809 A1 | 5/2002 | Kitayama |
| 2002/0096572 A1 | 7/2002 | Chene et al. |
| 2004/0133314 A1 | 7/2004 | Ehlers |
| 2004/0193324 A1 | 9/2004 | Hoog |
| 2004/0230402 A1 | 11/2004 | Jean |
| 2004/0245352 A1 | 12/2004 | Smith |
| 2004/0256472 A1 | 12/2004 | DeLuca |
| 2004/0260427 A1 | 12/2004 | Wimsatt |
| 2005/0027997 A1 | 2/2005 | Ueno et al. |
| 2005/0033707 A1 | 2/2005 | Ehlers |
| 2005/0040248 A1 | 2/2005 | Wacker |
| 2005/0040249 A1 | 2/2005 | Wacker |
| 2005/0044906 A1 | 3/2005 | Spielman |
| 2005/0082836 A1 | 4/2005 | Lagerwey |
| 2005/0108620 A1 | 5/2005 | Allyn et al. |
| 2005/0119793 A1 | 6/2005 | Amundson et al. |
| 2005/0194457 A1 | 9/2005 | Dolan |
| 2005/0198591 A1 | 9/2005 | Jarrett |
| 2006/0030954 A1 | 2/2006 | Bergman |
| 2006/0290140 A1 | 6/2006 | Yoshida |
| 2006/0220386 A1 | 10/2006 | Wobben |
| 2007/0045429 A1 | 3/2007 | Chapman, Jr. |
| 2007/0045441 A1 | 3/2007 | Ashworth |
| 2007/0114291 A1 | 5/2007 | Pouchak |
| 2007/0221741 A1 | 9/2007 | Wagner |
| 2007/0228182 A1 | 10/2007 | Wagner et al. |
| 2007/0228183 A1 | 10/2007 | Kennedy |
| 2007/0257120 A1 | 11/2007 | Chapman et al. |
| 2007/0278320 A1 | 12/2007 | Lunacek et al. |
| 2008/0271475 A1 | 11/2008 | Wuesthoff |
| 2009/0001182 A1 | 1/2009 | Siddaramanna |
| 2009/0024965 A1 | 1/2009 | Zhdankin |
| 2009/0045263 A1 | 2/2009 | Muller |
| 2009/0057424 A1 | 3/2009 | Sullivan et al. |
| 2009/0057427 A1 | 3/2009 | Geadelmann |
| 2009/0062964 A1 | 3/2009 | Sullivan |
| 2009/0129931 A1 | 5/2009 | Stiesdal |
| 2009/0140056 A1 | 6/2009 | Leen |
| 2009/0140064 A1 | 6/2009 | Schultz |
| 2010/0031193 A1 | 2/2010 | Stark |
| 2010/0070089 A1 | 3/2010 | Harrod et al. |
| 2010/0117975 A1 | 5/2010 | Cho et al. |
| 2010/0127502 A1 | 5/2010 | Uchino et al. |
| 2010/0145528 A1 | 6/2010 | Bergman et al. |
| 2010/0261465 A1 | 10/2010 | Rhoads |
| 2010/0318200 A1 | 12/2010 | Foslien |
| 2011/0004825 A1 | 1/2011 | Wallaert |
| 2011/0031806 A1 | 2/2011 | Altonen et al. |
| 2011/0046792 A1 | 2/2011 | Imes |
| 2011/0054710 A1 | 3/2011 | Imes |
| 2011/0112998 A1 | 5/2011 | Abe |
| 2011/0261002 A1 | 10/2011 | Verthein |
| 2011/0273394 A1 | 11/2011 | Young |
| 2012/0067561 A1 | 3/2012 | Bergman |
| 2012/0074710 A1 | 3/2012 | Yoshida |
| 2012/0131504 A1 | 5/2012 | Fadell |
| 2012/0168524 A1 | 7/2012 | Moore et al. |
| 2012/0169675 A1 | 7/2012 | Moore et al. |
| 2012/0203379 A1 | 8/2012 | Sloo |
| 2012/0221149 A1 | 8/2012 | Kasper |
| 2012/0229521 A1 | 9/2012 | Hales, IV |
| 2012/0232703 A1 | 9/2012 | Moore |
| 2012/0239221 A1 | 9/2012 | Mighdoll |
| 2012/0329528 A1 | 12/2012 | Song |
| 2013/0024685 A1 | 1/2013 | Kolavennu |
| 2013/0032414 A1 | 2/2013 | Yilmaz |
| 2013/0056989 A1 | 3/2013 | Sabhapathy |
| 2013/0090767 A1 | 4/2013 | Bruck et al. |
| 2013/0123991 A1 | 5/2013 | Richmond |
| 2013/0211783 A1 | 8/2013 | Fisher |
| 2013/0215088 A1 | 8/2013 | Son et al. |
| 2013/0263034 A1 | 10/2013 | Bruck |
| 2013/0338838 A1 | 12/2013 | Moore |
| 2013/0345883 A1 | 12/2013 | Sloo |
| 2014/0081465 A1 | 3/2014 | Wang |
| 2014/0098247 A1 | 4/2014 | Rao |
| 2014/0152631 A1 | 6/2014 | Moore et al. |
| 2014/0156087 A1 | 6/2014 | Amundson |
| 2014/0163746 A1 | 6/2014 | Drew |
| 2014/0254577 A1 | 9/2014 | Wright |
| 2014/0316581 A1 | 10/2014 | Fadell |
| 2014/0319233 A1 | 10/2014 | Novotny |
| 2015/0081568 A1 | 3/2015 | Land, III |
| 2015/0095843 A1 | 4/2015 | Greborio et al. |
| 2015/0100167 A1 | 4/2015 | Sloo et al. |
| 2015/0159899 A1* | 6/2015 | Bergman .............. F24F 11/62 700/276 |
| 2015/0159900 A1* | 6/2015 | Quam .................. H05K 7/12 700/276 |
| 2015/0159901 A1* | 6/2015 | Quam .................. F24F 11/62 700/276 |
| 2015/0159902 A1* | 6/2015 | Quam .................. F24F 11/62 700/278 |
| 2015/0159903 A1* | 6/2015 | Marak ................ F21V 23/005 700/278 |
| 2015/0159904 A1* | 6/2015 | Barton ................. H05K 7/12 236/1 C |
| 2015/0160633 A1* | 6/2015 | Adamik ............... H05K 7/12 362/555 |
| 2015/0163631 A1* | 6/2015 | Quam .................. H05K 7/12 455/456.1 |
| 2015/0163945 A1* | 6/2015 | Barton ................ H04L 67/025 361/809 |
| 2015/0167995 A1 | 6/2015 | Fadell |
| 2015/0233595 A1 | 8/2015 | Fadell |
| 2015/0280935 A1 | 10/2015 | Poplawski et al. |
| 2016/0062618 A1 | 3/2016 | Fagan |
| 2016/0123618 A1 | 5/2016 | Hester et al. |
| 2016/0124828 A1 | 5/2016 | Moore et al. |
| 2016/0131385 A1 | 5/2016 | Poplawski et al. |
| 2016/0154576 A1 | 6/2016 | Moore et al. |
| 2017/0103689 A1 | 4/2017 | Moore et al. |
| 2017/0131825 A1 | 5/2017 | Moore et al. |
| 2017/0300025 A1 | 10/2017 | Moore et al. |
| 2017/0364104 A1 | 12/2017 | Poplawski et al. |
| 2018/0005195 A1 | 1/2018 | Jacobson |
| 2018/0031266 A1 | 2/2018 | Atchison |

FOREIGN PATENT DOCUMENTS

| | | |
|---|---|---|
| JP | 2004218436 | 8/2004 |
| JP | 2006009596 | 1/2006 |
| KR | 20050034417 | 4/2005 |

OTHER PUBLICATIONS

Cardio lie Installer's Guide, System Version 2.5xx, 5th edition, 2008, Secant Home Automation Inc.

What you should know about flexible displays (FAQ); http://news.cnet.com/8301-1035_3-57607171-94/what-you-should-know-about-flexible-d . . . ; Nov. 25, 2013.

Brae8urn Systems LLC, "Temperature Limiting Adjustments for heating and Cooling (1000 Series)", Mportant Installation Instructions.

* cited by examiner

COMFORT CONTROL SYSTEM WITH HIERARCHICAL SWITCHING MECHANISMS

CROSS REFERENCE TO RELATED APPLICATIONS

NONE.

FIELD OF THE DISCLOSURE

The present invention generally relates to indoor comfort control systems, and more particularly relates to a comfort control system that supports a configuration access mode and an operation access mode. More particularly still, the present disclosure relates to a comfort control system that supports a configuration access mode and an operation access mode switched by a key combination and enabled by a circuit board switch.

DESCRIPTION OF BACKGROUND

Environment regulation systems, such as heating systems, ventilation systems, air conditioners, humidifiers and dehumidifiers, are widely used in residential and commercial buildings. These environment regulation systems (also referred to herein as comfort regulation systems and comfort systems) are usually controlled by comfort control systems, such as thermostats. A comfort control system is electronically wired to one or more comfort systems. A user configures the comfort control system. The configuration is then applied by the comfort control system in controlling the operation of the comfort system. The configuration can include, for example, desired temperatures and humidity levels for certain time frames.

When the comfort control system is being configured, it is said to be in a configuration mode. In the configuration mode, the configuration settings are configured via menus and display screens. The configuration settings can include various types of settings, such as system settings, programming settings, fan control settings, auto changeover settings, Fahrenheit and Celsius temperature scale settings, deadband settings, etc. When the comfort control system applies the configuration, the comfort control system is said to be in an operation mode (also referred herein as operational mode). Accordingly, it desirable to provide a switching mechanism to switch between the configuration mode and the operation mode. The mode switching mechanism is also referred to herein as a higher tier switching mechanism (also referred to herein as a computer program switching mechanism).

Comfort control systems are oftentimes physically accessible to different people. For instance, comfort control systems in hotel rooms and public housing situations are physically accessible to different guests on different days. As another example, comfort control systems in warehouses may be physically accessible to different employees, contractors, maintenance personnel, janitors and other professional individuals. It is thus desirable to safeguard the higher tier switching mechanism and limit the availability of the mode switching mechanism. In other words, a lower tier switching mechanism (also referred to herein as a first tier switching mechanism and an electronic switching mechanism) is desired to enable or disable the higher tier switching mechanism.

OBJECTS OF THE DISCLOSED SYSTEM, METHOD, AND APPARATUS

Accordingly, it is an object of this disclosure to provide an improved indoor comfort control system with a hierarchy of switching mechanisms for switching between a configuration mode and an operational mode.

Another object of this disclosure is to provide an improved indoor comfort control system with a hierarchy of two tiers of switching mechanisms for switching between a configuration mode and an operational mode.

Another object of this disclosure is to provide an improved indoor comfort control system having an electronic switching mechanism and a computer program switching mechanism for switching between a configuration mode and an operational mode.

Another object of this disclosure is to provide an improved indoor comfort control system having an electronic switching mechanism with a jumper and a computer program switching mechanism for switching between a configuration mode and an operational mode.

Another object of this disclosure is to provide an improved indoor comfort control system having an electronic switching mechanism with a jumper and a computer program switching mechanism based on a special key combination for switching between a configuration mode and an operational mode.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides an improved comfort control system for controlling an environment regulation system. The comfort control system includes a processing unit, a video interface operatively coupled to the processing unit, a user input subsystem operatively coupled to the processing unit, and a first tier switching subsystem operatively coupled to the processing unit for switching the comfort control system from a configuration mode to an operation mode. The first tier switching subsystem includes a jumper. The comfort control system also includes a power subsystem operatively coupled to the processing unit, and a second tier switching mechanism for switching the comfort control system from a configuration mode to an operation mode. The second tier switching mechanism includes a first key combination. The comfort control system further includes a special computer program implementing the second tier switching mechanism and running on the processing unit. The special computer program is adapted to switch the improved comfort control system from the configuration mode to the operation mode when the first key combination is entered via the user input subsystem and the jumper is in an enabled position. The second tier switching mechanism does not switch the comfort control system from the configuration mode to the operation mode when the jumper is in a disabled position. The jumper includes a first male contact, a second male contact, a third male contact and a female connecting point having two receptacles adapted to receive the first, second and third male contacts. The jumper is in the enabled position when the female connecting point receives the first and second male contacts, and the jumper is in the disabled position when the female connecting point receives the second and third male contacts.

Further in accordance with the present teachings is an improved comfort control system for controlling an environment regulation system. The comfort control system includes a processing unit, a video interface operatively coupled to the processing unit, a user input subsystem operatively coupled to the processing unit, a first tier switching subsystem operatively coupled to the processing unit for switching the comfort control system from a configuration mode to an operation mode, a power subsystem operatively coupled to the processing unit, a second tier switching mechanism for switching the comfort control system from the configuration mode to the operation mode, and a special computer program implementing the second tier switching mechanism and running on the processing unit. The second tier switching mechanism is adapted to switch the comfort control system from the configuration mode to the operation mode when the first tier switching subsystem is in an enabled position. The second tier switching mechanism cannot switch the comfort control system from the configuration mode to the operation mode when the first tier switching subsystem is in a disabled position.

The first tier switching subsystem is an electronic switching subsystem including a jumper. In one implementation, the jumper includes a first male contact, a second male contact, a third male contact and a female connecting point having two receptacles adapted to receive the first, second and third male contacts. The first tier switching subsystem is in the enabled position when the female connecting point receives the first and second male contacts, and the first tier switching subsystem is in the disabled position when the female connecting point receives the second and third male contacts. Alternatively, the jumper includes a first male contact, a second male contact and a female connecting point having two receptacles adapted to receive the first and second male contacts. The first tier switching subsystem is in the enabled position when the female connecting point receives the first and second male contacts, and the first tier switching subsystem is in the disabled position when the female connecting point does not receive the second and third male contacts at the same time.

The second tier switching mechanism includes a first key combination. The special computer program is adapted to switch the improved comfort control system from the configuration mode to the operation mode when the first key combination is entered via the user input subsystem and the first tier switching subsystem is in the enabled position; and the special computer program does not switch the improved comfort control system from the configuration mode to the operation mode when the first key combination is not entered or the first tier switching subsystem is in the disabled position. The second tier switching mechanism further includes a second key combination. The special computer program is adapted to switch the improved comfort control system from the configuration mode to the operation mode when the second key combination is entered; and the special computer program does not switch the improved comfort control system from the configuration mode to the operation mode when the second key combination is not entered. The first key combination is same as or different from the second key combination. The improved comfort control system includes a wireless network interface operatively coupled to the processing unit.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
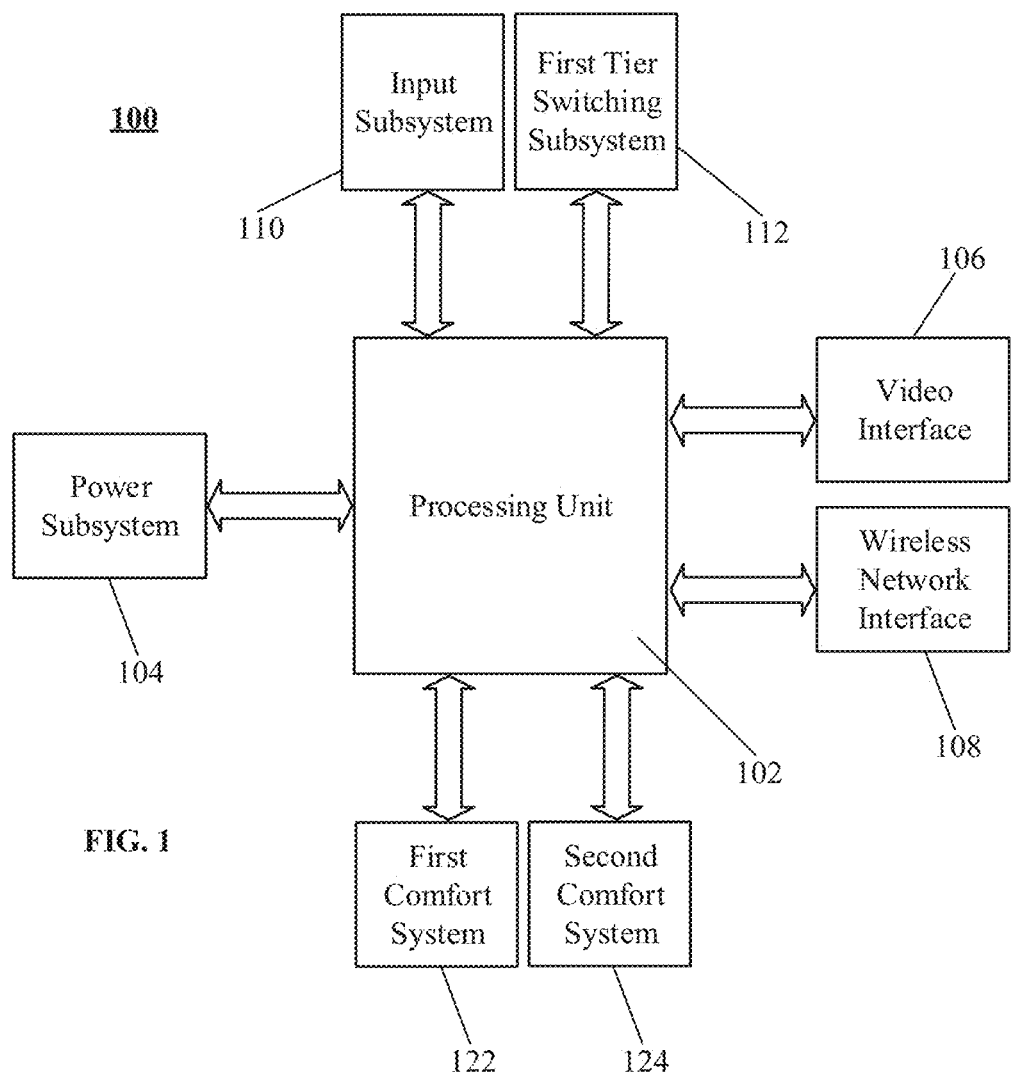
FIG. 1 is a simplified block diagram of an improved comfort control system for controlling an environment regulation system in accordance with this disclosure.

Turning to the Figures and to FIG. 1 in particular, a block diagram of an improved comfort control system for controlling environment regulation systems is shown and generally indicated at 100. The illustrative comfort control system 100 (such as a thermostat device) includes a processing unit 102 (such as a central processing unit), a power subsystem 104 operatively coupled to the processing unit 102, a video interface 106 operatively coupled to the processing unit 102, a wireless interface 108 operatively coupled to the processing unit 102, an input subsystem 110 operatively coupled to the processing unit 102, and a first tier switching subsystem 112 operatively coupled to the processing unit 102. The power subsystem 104 draws power from a battery or an external power supply (not shown). The video interface 106 includes a displaying screen (also referred to herein as a display) for showing user interfaces and data. The wireless network interface 108, such as a Bluetooth® and Wi-Fi networking interface, is optional. The comfort control system 100 (such as a thermostat) communicates with the Internet and/or a remote mobile device (such as a smartphone) over the wireless network interface. The input subsystem 110 can be, for example, a keypad input subsystem. A user uses the user input subsystem 110 to enter user inputs for operating the comfort control system 100.

The comfort control device 100 is operatively coupled to and controls one or more comfort systems indicated at 122 and 124. The comfort systems 122 and 124 are electronically wired or wirelessly connected to the comfort control system 100. The comfort systems 122-124 can be, for example, a heating furnace system, an air conditioning system, a humidifier, etc.

The first tier switching subsystem 112 is an electronic switching subsystem. In one implementation, the electronic switching mechanism 112 includes a jumper provided on a circuit board of the comfort control system 100. The processing unit 102 is also provided on the circuit board. For instance, the processing unit 102 is attached or mounted to a socket of the circuit board. The jumper 112 is further illustrated by reference to FIGS. 3, 4 and 5.

Figure 3:
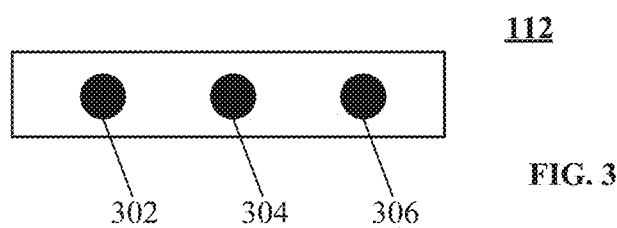
FIG. 3 is simplified block diagram illustrating an electronic switching mechanism of an improved comfort control system in accordance with this disclosure.

Turning first to FIG. 3, a block diagram of the jumper 112 is illustrated. The illustrative jumper 112 includes three male contacts 302, 304 and 306. Connecting the contacts 302 with 304 puts the comfort control system 100 into a first state, while connecting the contacts 304 with 306 puts the comfort control system into a second state. In one implementation, in the first state, the higher tier switching mechanism (also referred to herein as a second tier switching mechanism) is enabled; and in the second state, the second tier switching mechanism is disabled. In such a case, the first tier switching subsystem 112 is said to be in an enabled state when it is in the first state, and in a disabled state when it is in the second state. Alternative, in the first state, the second tier switching mechanism is disabled; and in the second state, the second tier switching mechanism is enabled. In such a case, the first tier switching subsystem 112 is said to be in the disabled state when it is in the first state, and in the enabled state when it is in the second state. The enabled state and the disabled state also interchangeable referred to herein as the enabled position and the disabled position respectively. The first tier switching mechanism and the second tier switching mechanism form a hierarchy of mode switching mechanisms of the improved comfort control device 100.

Figure 4:
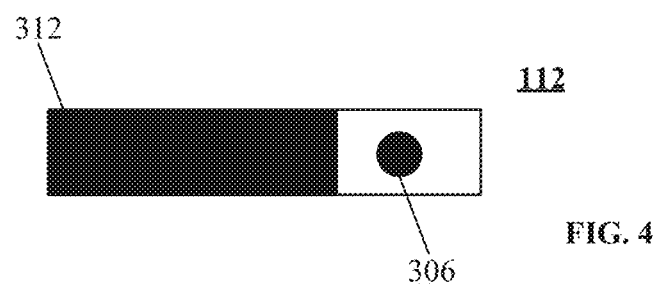
FIG. 4 is simplified block diagram illustrating an electronic switching mechanism of an improved comfort control system in accordance with this disclosure.
Figure 5:
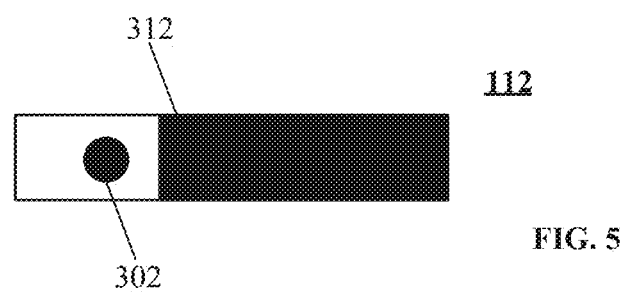
FIG. 5 is simplified block diagram illustrating an electronic switching mechanism of an improved comfort control system in accordance with this disclosure.

Referring now to FIGS. 4 and 5, a female connecting point 312 containing two female receptacles for receiving the male contacts 302-306 is shown operatively coupled to the male contacts 302-306. In FIG. 4, the female connecting point 312 receives the male contacts 302-304 and thus connects the male contacts 302-304. In FIG. 5, the female connecting point 312 receives the male contacts 304-306 and thus connects the male contacts 304-306. In one implementation, FIGS. 4 and 5 illustrate the first state and the second state respectively. In other words, FIG. 4 illustrates the enabled state of the jumper 112, while FIG. 5 illustrates the disabled state of the jumper 112.

Figure 10:
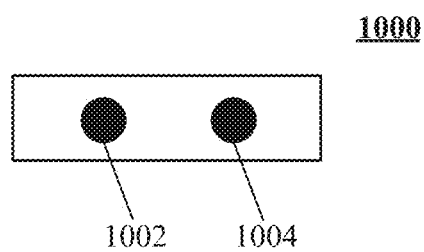
FIG. 10 is simplified block diagram illustrating an electronic switching mechanism of an improved comfort control system in accordance with this disclosure.
Figure 11:
FIG. 11 is simplified block diagram illustrating an electronic switching mechanism of an improved comfort control system in accordance with this disclosure.

In an alternate embodiment, the first tier switching subsystem 112 includes a jumper with two male contacts 1002 and 1004, and is shown and indicated at 1000 in FIGS. 10 and 11. In FIG. 10, no female connecting point connects the male contacts 1002-1004. In such a case, the electronic switching mechanism 1000 is in a disabled state. In FIG. 11, a female connecting point 1012 connects the male contacts 1002-1004. In such a case, the electronic switching mechanism 1000 is in the enabled state. Furthermore, the electronic switching mechanism 1000 is in a disabled position when the female connecting point 1012 does not connect both of the male contacts 1002-1004 at the same time. In an alternate embodiment, the electronic switching mechanism 1000 is in the enabled position in FIG. 10 and in the disabled position in FIG. 11.

Figure 2:
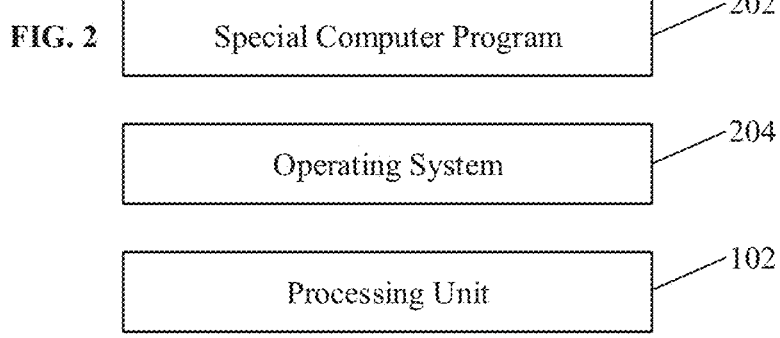
FIG. 2 is a simplified block diagram illustrating an improved comfort control system for controlling an environment regulation system in accordance with this disclosure.

Referring to FIG. 2, a block diagram of the comfort control system 100 is shown. In one embodiment, an operating system (such as Linux operating system) 204 runs on the processing unit 102. A special computer program 202 runs on the operating system 204. The special computer program 202 is written in one or more computer programming languages, such as C, C++, Java, etc. The special computer program 202 is executed by the processing unit 102, and thus said to run on the processing unit. The special computer program 202 (also referred to herein as a computer software and a computer software application) retrieves user inputs, processes the user inputs, displays user interface elements and data on the video interface 106, and communicates with the Internet, mobile devices, computers and/or other types of electronic devices over the wireless network interface 108.

Figure 8:
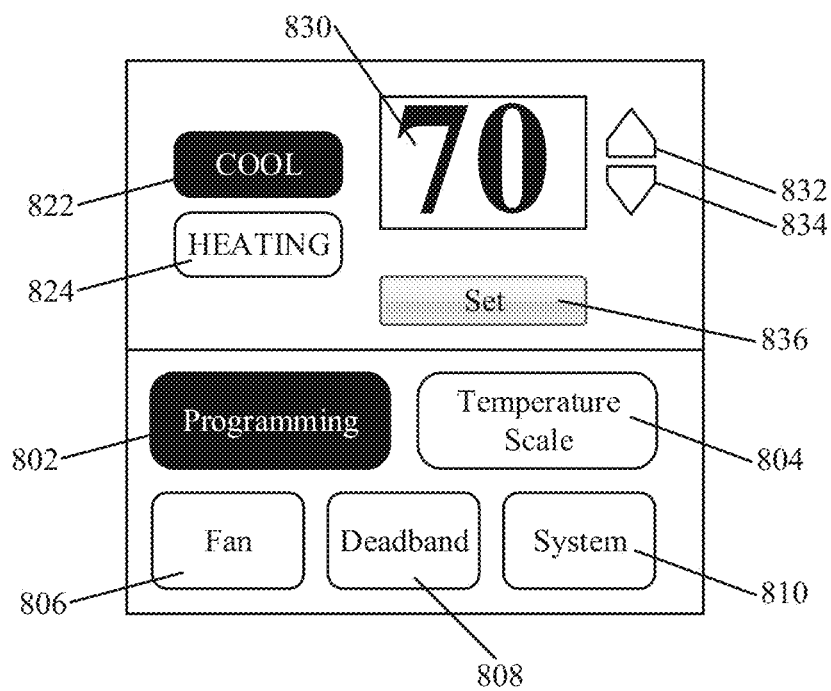
FIG. 8 is simplified block diagram illustrating a configuration mode screen of an improved comfort control system in accordance with this disclosure.

The special computer program 202 operates the comfort control system 100 in the configuration mode and the operational mode. The configuration mode is further illustrated by reference to FIG. 8. Referring to FIG. 8, an illustrative screen of the configuration mode is shown and generally indicated at 800. In the configuration mode, a user is allowed to configure settings of the comfort control system 100.

The illustrative configuration mode screen 800 includes a programming button 802, a temperature scale button 804, a fan button 806, a deadband button 808, a system button 810, a cool button 822, a heating button 824, a temperature indicator 830, a set button 836, and two adjustment buttons 832. Pressing the programming button 802 causes the special computer program 202 to display a screen with settings related to programming for a user to view and change. In the illustrative screen 800, the programming button 802 is pressed, and the programming setting configuration mode is on.

Pressing the temperature scale button 804 causes the special computer program 202 to display a screen with settings for the user to view and/or adjust Fahrenheit and Celsius temperature scales. Pressing the fan button 806 causes the special computer program 202 to display a user interface screen with settings for the user to view and/or adjust fan related settings. Pressing the deadband button 808 causes the special computer program 202 to display a user interface screen with settings for the user to view and/or adjust deadband related settings. Pressing the system button 810 causes the special computer program 202 to display a user interface screen with settings for the user to view and/or adjust system settings. Pressing the cool button 822 causes the special computer program 202 to allow the user to view and/or configure air conditioning related settings. Pressing the heating button 824 causes the special computer program 202 to allow the user to view and/or configure heating related settings. The temperature indicator 830 displays a temperature being configured by using the adjustment buttons 832-834. Once a desired temperature is indicated at 830, processing the set button 836 causes the special computer program 202 to store and apply the temperature 830. The desired temperature can be, for example, a desired cool temperature or a desired heating temperature.

Figure 9:
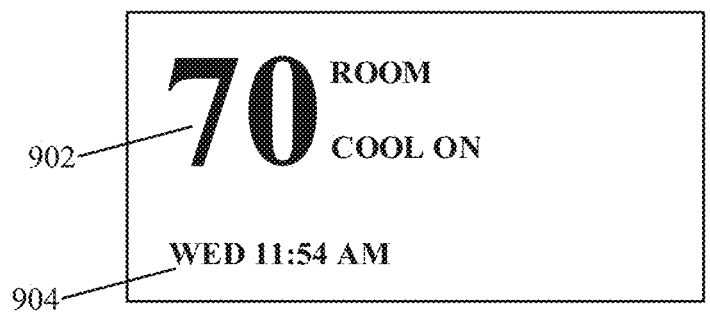
FIG. 9 is simplified block diagram illustrating an operation mode screen of an improved comfort control system in accordance with this disclosure.

The operation mode is further illustrated by reference to FIG. 9. Referring to FIG. 9, an illustrative screen of the operational mode is shown and generally indicated at 900. In the operation mode, a user is not allowed to adjust any or certain settings of the comfort control device 100. Instead, the operation mode screen 900 indicates certain data, such as the present temperature 902 and the present date and time 904. Additional information, such as the cooling and heating information, can also be displayed on the screen 900. The data displayed on the operational mode screen 900 indicates the present status of the comfort control system 100.

The second tier switching mechanism allows a user to switch between the configuration mode and the operation mode. In one implementation, the second tier switching mechanism is supported by the special computer program 202. In particular, when the user enters a key combination, the special computer program 202 switches to the configuration mode from the operational mode. When the user enters a second key combination, the special computer program 202 switches to the operational mode from the configuration mode. The key combination (also referred hereto as the first key combination and the first special key combination) can be same as the second key combination (also referred hereto as the second special key combination). They could also be different. The first and second key combinations can be entered using a physical keypad or a computer software implemented keypad displayed on the video interface 106. For example, the two key combinations (also referred to herein as switching commands, special commands, and mode switch commands) are the same special key combination of the temperature scale and system keys. The hierarchy of the two mode switch mechanisms are further illustrated by reference to FIGS. 6 and 7.

Figure 6:
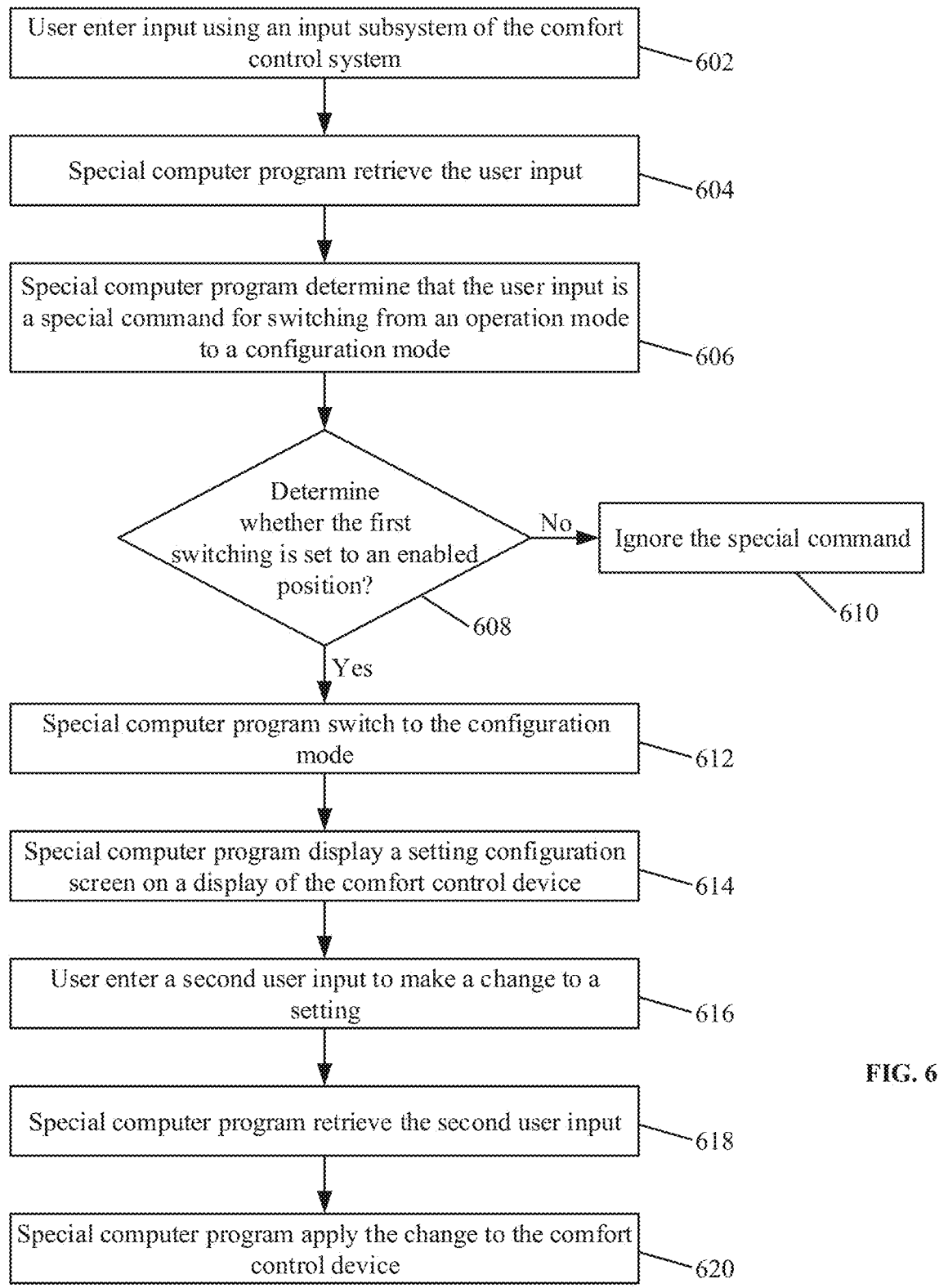
FIG. 6 is a flowchart depicting a process by which an improved comfort control system switches from an operation mode to a configuration mode in accordance with this disclosure.

Referring to FIG. 6, a flowchart depicting a process by which the comfort control system 100 switches from the operation mode to the configuration mode is shown and generally indicated at 600. At 602, the user enters an input using the input subsystem 110 (such as a keypad). At this point, the comfort control system 100 is in the operation mode. At 604, the special computer program 202 retrieves the user input. At 606, the special computer program 202 determines that the user input is the first key combination for switching from the operation mode to the configuration mode. If the user input is not the first key combination, the special computer program 202 then does not perform the mode switch. Instead, it regards the user input as regular user input to the comfort control system 100.

At 608, the special computer program 202 determines whether the first tier switching mechanism is at the enabled position. For example, the special computer program 202 calls an application programming interface provided by the operation 204 system, or accesses a particular memory location containing status data indicating the first or second state, to determine whether the first tier switching mechanism is at the enabled position. If the first tier switching mechanism is at the disabled position, at 610, the special computer program 202 ignores the special command entered at 602. In other words, when the first tier switching mechanism is at the disabled position, the special command cannot switch the comfort control system 100 to the operation mode from the configuration mode.

Otherwise, at 612, the special computer program 202 switches to the configuration mode. In such a case, it is said the special command (i.e., the first key combination) switches the comfort control system 100 from the configuration mode to the operation mode. At 614, the special computer program 202 displays a setting configuration screen (such as the illustrative screen 800) on the video interface 106. At 616, the user enters a second user input (such as a click on a button in the screen 800 or key presses on a keypad) for changing a setting of the comfort control device 100. At 618, the special computer program 202 retrieves the second user input. At 620, the special computer program 202 applies the second user input and the corresponding configuration change to the comfort control system 100.

Figure 7:
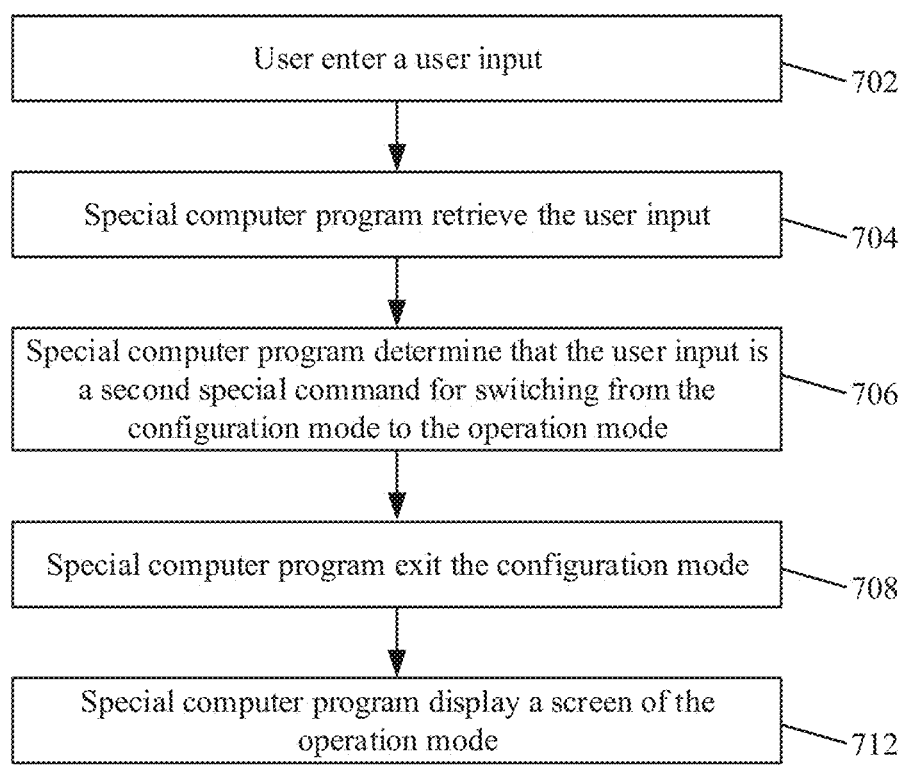
FIG. 7 is a flowchart depicting a process by which an improved comfort control system switches from a configuration mode to an operation mode in accordance with this disclosure.

The second tier switching mechanism further allows the user to switch from the configuration mode to the operation mode. The switching is further illustrated by reference to FIG. 7. Turning to FIG. 7, a flowchart illustrating a process by which the comfort control system 100 switches from the configuration mode to the operation mode is shown and generally indicated at 700. At 702, the user enters a user input. At 704, the special computer program 202 retrieves the user input. At 706, the special computer program 202 determines that the user input is a second special command. In one implementation, the second special command is a second key combination that is the same as the first key combination. Alternatively, they are different. In an alternate embodiment, the second special command is a click or press on a button provided in the configuration mode.

If the user input is not the second special command, the special computer program 202 regards it as regular user input in the configuration mode. When the user input is the second special command, at 708, the special computer program 202 exits the configuration mode. At 712, the special computer program 202 displays an operational mode screen (such as the screen 900).

Obviously, many additional modifications and variations of the present disclosure are possible in light of the above teachings. Thus, it is to be understood that, within the scope of the appended claims, the disclosure may be practiced otherwise than is specifically described above. As an example, the mode switch commands are implemented as a particular moving pattern of a stylus or a finger moving on a touch screen of the comfort control device. As an additional example, the comfort control device 100 does not incorporate the wireless network interface 108 without deviating from the present teachings.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. An improved comfort control system for controlling an environment regulation system, said comfort control system comprising:
   i) a processing unit;
   ii) a video interface operatively coupled to said processing unit;
   iii) a user input subsystem operatively coupled to said processing unit;
   iv) a first tier switching subsystem operatively coupled to said processing unit for switching a second tier switching mechanism between enabled and disabled modes, said first tier switching subsystem including a jumper;
   v) a power subsystem operatively coupled to said processing unit; and
   vi) said second tier switching mechanism for switching said comfort control system between a configuration mode and an operation mode, said second tier switching mechanism including a first key combination;
   vii) a special computer program implementing said second tier switching mechanism and running on said processing unit; and
   viii) wherein:
      1) said special computer program is adapted to switch said improved comfort control system from said operation mode to said configuration mode when said first key combination is entered via said user input subsystem and said jumper is in an enabled state;
      2) said second tier switching mechanism does not switch said comfort control system from said operation mode to said configuration mode when said jumper is in a disabled state; and
      3) said jumper includes a first male contact, a second male contact, a third male contact and a female connecting point having two receptacles adapted to receive said first, second and third male contacts, wherein said jumper is in said enabled state when said female connecting point receives said first and second male contacts, and said jumper is in said disabled state when said female connecting point receives said second and third male contacts.

2. The improved comfort control system of claim 1 wherein said special computer program does not switch said improved comfort control system from said operation mode to said configuration mode when said jumper is in said disabled state.

3. An improved comfort control system for controlling an environment regulation system, said comfort control system comprising:
   i) a processing unit;
   ii) a video interface operatively coupled to said processing unit;
   iii) a user input subsystem operatively coupled to said processing unit;
   iv) a first tier switching subsystem operatively coupled to said processing unit for switching a second tier switching mechanism between enabled and disabled modes, said first tier switching subsystem being an electronic switching system and including a jumper;
   v) a power subsystem operatively coupled to said processing unit; and
   vi) said second tier switching mechanism for switching said comfort control system between a configuration mode and an operation mode; and
   vii) a special computer program implementing said second tier switching mechanism and running on said processing unit, wherein:
      1) said second tier switching mechanism is adapted to switch said comfort control system from said configuration mode to said operation mode when said first tier switching subsystem is in an enabled state;
      2) said second tier switching mechanism cannot switch said comfort control system from said configuration mode to said operation mode when said first tier switching subsystem is in a disabled state; and
      3) said jumper includes a first male contact, a second male contact, a third male contact and a female connecting point having two receptacles adapted to receive said first, second and third male contacts, wherein said first tier switching subsystem is in said enabled state when said female connecting point receives said first and second male contacts, and said first tier switching subsystem is in said disabled state when said female connecting point receives said second and third male contacts.

4. The improved comfort control system of claim 3 wherein said second tier switching mechanism includes a second key combination, wherein:
   i) said special computer program is adapted to switch said improved comfort control system from said configuration mode to said operation mode when said second key combination is entered; and
   ii) said special computer program does not switch said improved comfort control system from said configuration mode to said operation mode when said second key combination is not entered.

5. The improved comfort control system of claim 4 wherein said first key combination is same as said second key combination.

6. The improved comfort control system of claim 4 wherein said first key combination is different from said second key combination.

7. The improved comfort control system of claim 3 further comprising a wireless network interface operatively coupled to said processing unit.

8. The improved comfort control system of claim 3 wherein said special computer program does not switch said improved comfort control system from said operation mode to said configuration mode when said jumper is in said disabled state.

9. An improved comfort control system for controlling an environment regulation system, said comfort control system comprising:
   i) a processing unit;
   ii) a video interface operatively coupled to said processing unit;
   iii) a user input subsystem operatively coupled to said processing unit;
   iv) a first tier switching subsystem operatively coupled to said processing unit for switching a second tier switching mechanism between enabled and disabled modes, said first tier switching subsystem being an electronic switching system and including a jumper;
   v) a power subsystem operatively coupled to said processing unit; and
   vi) said second tier switching mechanism for switching said comfort control system between a configuration mode and an operation mode; and vii) a special computer program implementing said second tier switching mechanism and running on said processing unit, wherein:
1) said second tier switching mechanism is adapted to switch said comfort control system from said configuration mode to said operation mode when said first tier switching subsystem is in an enabled state;
2) said second tier switching mechanism cannot switch said comfort control system from said configuration mode to said operation mode when said first tier switching subsystem is in a disabled state; and
3) said jumper includes a first male contact, a second male contact and a female connecting point having two receptacles adapted to receive said first and second male contacts, wherein:
a) said first tier switching subsystem is in said enabled state when said female connecting point receives said first and second male contacts, and said first tier switching subsystem is in said disabled state when said female connecting point does not receive said second and third male contacts at the same time; or
b) said first tier switching subsystem is in said disabled state when said female connecting point receives said first and second male contacts, and said first tier switching subsystem is in said enabled state when said female connecting point does not receive said second and third male contacts at the same time.

10. The improved comfort control system of claim 9 further comprising a wireless network interface operatively coupled to said processing unit.

11. The improved comfort control system of claim 9 wherein said special computer program does not switch said improved comfort control system from said operation mode to said configuration mode when said jumper is in said disabled state.

* * * * *